US006879846B1

United States Patent
Miyata

(10) Patent No.: US 6,879,846 B1
(45) Date of Patent: Apr. 12, 2005

(54) DESTINATION CALLING CONTROL SYSTEM AND DESTINATION CALLING CONTROL METHOD

(75) Inventor: Akiko Miyata, Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/479,564

(22) Filed: Jan. 7, 2000

(30) Foreign Application Priority Data

Jan. 12, 1999 (JP) ............................................. 11-005534

(51) Int. Cl.⁷ ............................ H04B 1/38; H04M 1/00; G09G 5/00
(52) U.S. Cl. ..................... 455/566; 455/564; 455/414.1; 455/414.2; 455/457; 455/456.3; 345/173; 345/700; 348/333.01; 348/333.02
(58) Field of Search ................................. 455/566, 564, 455/569, 557, 550, 575, 90, 414, 456, 457; 345/173, 700; 348/207, 220, 239, 333.01, 333.02, 333.12; 701/200, 201, 208, 207; 340/539.2, 525

(56) References Cited

U.S. PATENT DOCUMENTS

| 5,671,014 A | * | 9/1997 | Ito et al. ...................... 348/239 |
| 6,044,248 A | * | 3/2000 | Mochizuki et al. ......... 455/38.4 |
| 6,067,082 A | * | 5/2000 | Enmei ......................... 345/174 |
| 6,351,655 B1 | * | 2/2002 | Tsuji et al. .................. 455/564 |
| 6,385,465 B1 | * | 5/2002 | Yoshioka ..................... 455/564 |

FOREIGN PATENT DOCUMENTS

| JP | 63-316966 | 12/1988 |
| JP | 2-89482 | 3/1990 |
| JP | 2-113657 | 4/1990 |
| JP | 2-159188 | 6/1990 |
| JP | 4-38049 | 2/1992 |

* cited by examiner

Primary Examiner—Lee Nguyen
Assistant Examiner—Eugene Yun
(74) Attorney, Agent, or Firm—Dickstein, Shapiro, Morin & Oshinsky, LLP.

(57) ABSTRACT

A destination calling control system comprising a database 5, an image data storage unit 4, a display unit 2 on which image data stored in the image data storage unit 4 is displayed, area specification means for allowing the user to specify a desired area within an image displayed on the display unit 2, an input unit 3 through which the user enters destination data, a data registration unit 12 which calculates the coordinates of a destination image area specified by the above-described area specification means as a destination image area, associates the coordinates with destination data entered from the display unit 2, and registers the correspondence data with the database 5, and a destination data search unit 13 which calculates the coordinates of an area specified by the area specification means as the destination and, based on the calculated coordinates, searches the database 5 for destination data.

33 Claims, 5 Drawing Sheets

F I G. 3

| AREA | DESTINATION TELEPHONE NUMBER | DESTINATION FAX NUMBER | DESTINATION ELECTRONIC MAIL ADDRESS | NAME |
|---|---|---|---|---|
| 1-3,23,24,22,34,56 | 03-xxxx-1111 | 03-xxxx-1112 | | AKIKO |
| 1-3,56,57,56,58,59 | 048-xxx-1111 | | | |

F I G. 4
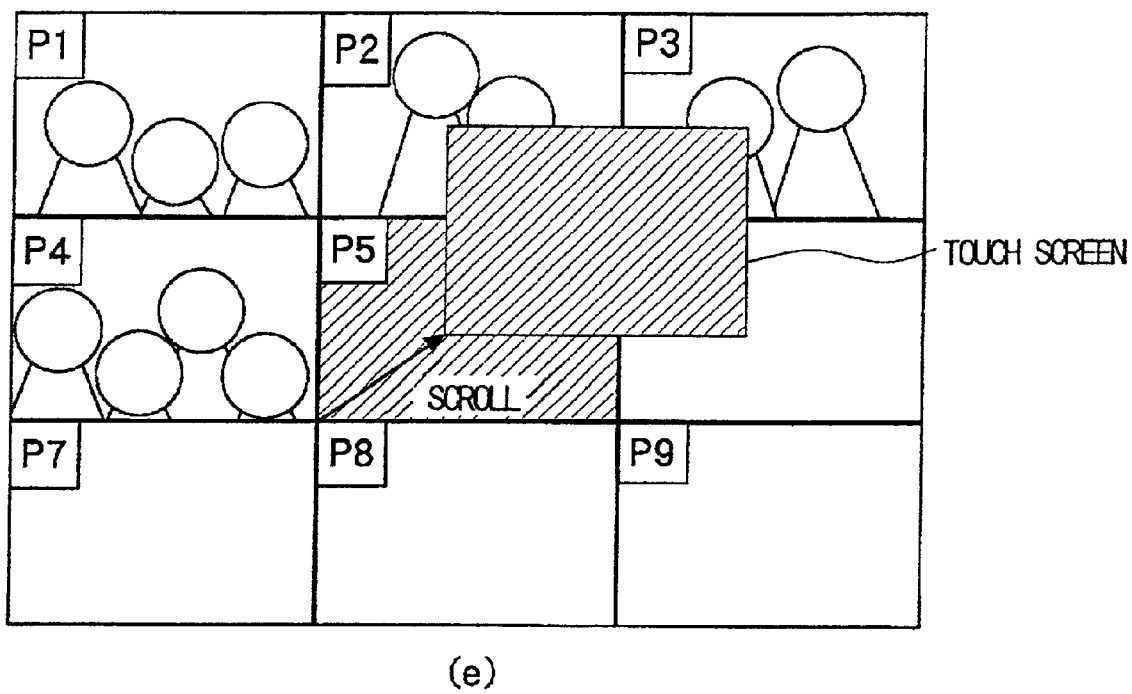
(e)
F I G. 5 (a)　　F I G. 5 (b)
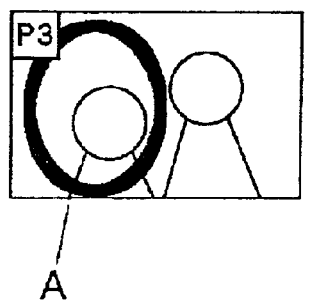　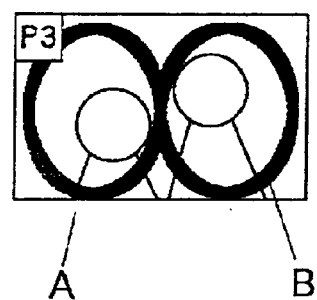

F I G. 6
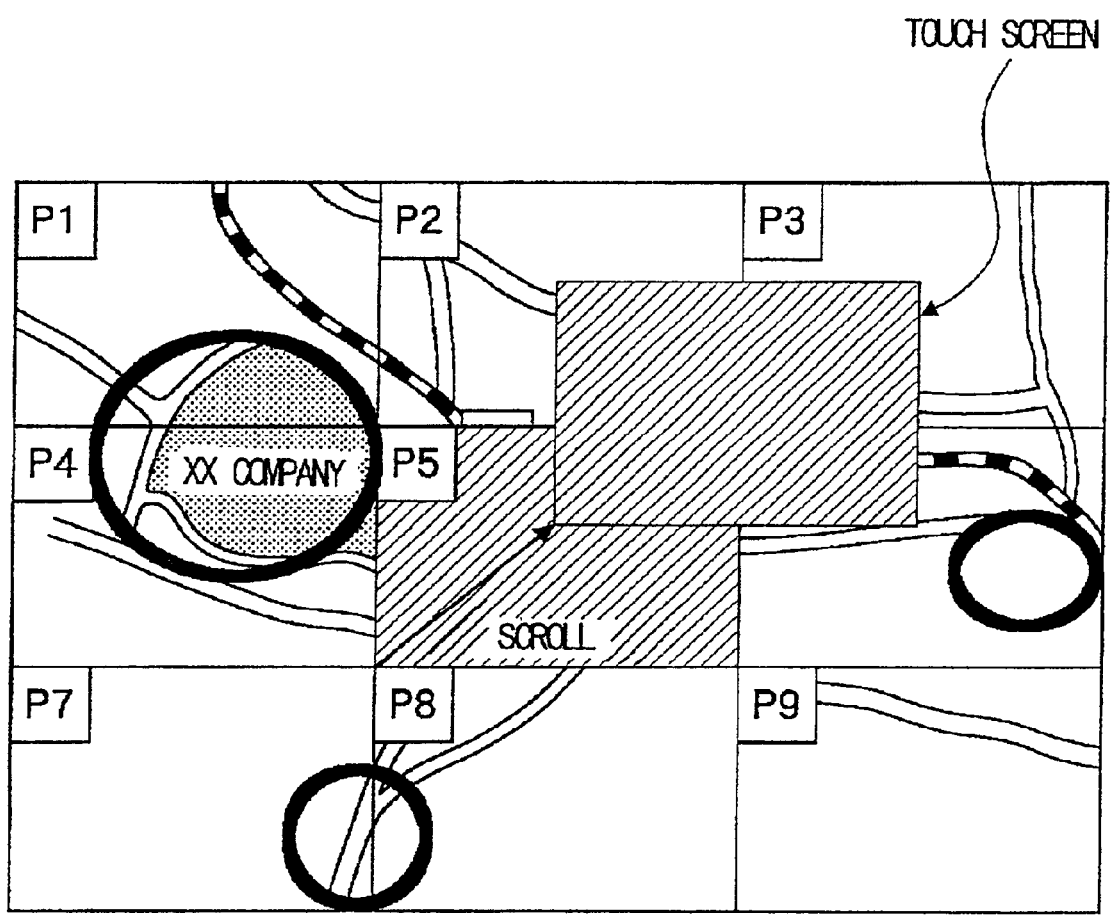

DESTINATION CALLING CONTROL SYSTEM AND DESTINATION CALLING CONTROL METHOD

FIELD OF THE INVENTION

The present invention relates to a system and a method for controlling a call to a destination using a database, and more particularly to a destination calling control system and a destination calling control method that are applied to a terminal with the communication function such as a portable data terminal or a cellular phone.

BACKGROUND OF THE INVENTION

In general, a cellular phone has a memory function unit to allow desired destination telephone numbers to be registered therein. Telephone numbers registered in this memory function unit may be displayed on the display panel of a cellular phone. Before making a call, the user may display telephone numbers on the display and select one of them to call a desired party.

However, because the display screen of a cellular phone, as well as characters displayed on the screen, is small, there is a problem that, when making a call using the memory function described above, the user finds it difficult to select and specify displayed character data (destination telephone number and name, and so on).

To solve this problem, a technology allowing a destination to be selected and specified with image data, not with character data, is proposed. For example, Japanese Patent Kokai Publication JP-A-2-159188 discloses a technology that associates destination images with destination telephone numbers, stores the associated data in a storage unit, sequentially displays the stored destination images on the display panel, and allows the user to select and specify a desired destination image to call the associated destination telephone number. This technology enables the user to determine a destination based on the image data, thus making it easier to select and specify the destination.

SUMMARY OF THE DISCLOSURE

However, according to the technology disclosed in Japanese Patent Kokai Publication JP-A-2-159188, because there is a one-to-one correspondence between destination images and destination telephone numbers and, in addition, stored destination images must be read sequentially from the memory, it takes time to select and specify a desired destination.

To increase operability, some users request that image data generated by photographing a plurality of destinations be displayed so that a desired destination in the displayed image may be selected and specified to make a call. However, because destination images and destination telephone numbers are associated on a one-to-one basis according to the technology disclosed in the above publication, this request cannot be met.

It is an object of the present invention to provide a destination calling control system and a destination calling control method which feature superior operability and which allow the user to select and specify a destination easily and quickly.

To achieve the above object, the destination calling control system in accordance with the present invention comprises database means; image storage means for storing therein image data; display means for displaying thereon the image data stored in the image storage means; area specification means for allowing a user to specify a desired area within the image displayed on the display means; input means through which the user enters destination data; data registration means for calculating coordinate data of the area specified by the area specification means as a destination image area, associating the coordinate data with the destination data entered from the input means, and for registering the associated data with the database means; destination data search means for calculating the coordinates of the area specified by the area specification means as a destination and for searching the database means for the destination data based on the coordinates; and calling means for calling the destination based on the destination data obtained by the destination data search means.

In the above case, the display means may comprise a touch screen; and the area specification means may allow the user to specify the area through the touch screen.

The data registration means may extract an outline of a destination object in the destination image area specified by the area specification means, calculate the coordinate data of an area encircled by the outline, associate the coordinate data with the destination data entered from the input means, and store the associated data into the database means.

The destination calling control system may further comprise image capturing means for capturing destination images; title image creation means for creating a title image; and image pasting means for pasting the title image created by the title image creation means and the plurality of destination images captured by the image capturing means and for storing the pasted images into the image storage means.

In the above case, the display means may display the title image of a paste image stored in the image storage means as a reference and allow the user to scroll across a whole of the paste image.

Each destination image and the title image of the paste image stored in the image storage means may be each assigned a number on a numeric key on a ten-key pad, and the display means may display the destination image or the title image in response to the number of the numeric key that is pressed.

The destination image captured by the image capturing means may be a photograph image.

At least one of destination images of the paste image may be a handwritten input image (for example, an image entered by handwriting characters and pictures) created by the title image creation means.

The destination calling control method according to the present invention comprises a first step of capturing desired image data and of storing the data; a second step of allowing a user to specify a desired area within an image displayed based on the image data stored in the first step and, at the same time, to enter destination data on the destination image area; a third step of calculating coordinate data of the destination image area specified in the second step, associating the coordinate data with the destination data on the destination image area, the destination data being entered in the second step, and registering the associated data with a database; a fourth step of allowing the user to specify, as a destination, the desired area in the image displayed based on the image data stored in the first step; and a fifth step of calculating the coordinate of the area specified in the fourth step, searching the database for the destination data based on the coordinate, and calling the destination based on the destination data.

In the above case, a paste image, created by pasting a plurality of destination images and a title image, may be stored as the image data stored in the first step, the title image of the stored paste image may be displayed as a reference, and a desired destination image may be selected by continuously scrolling across a whole of the paste image on the display screen.

A paste image, created by pasting a plurality of destination images and a title image, may be stored as the image data stored in the first step, each destination image and the title image of the stored paste image may be each assigned a unique number on a numeric key on a ten-key pad, and the destination image or the title image may be displayed in response to the number of the numeric key that is pressed.

In addition, a photograph image or a handwritten input image (for example, an image entered by handwriting characters and pictures) may be used as the destination images constituting the paste image.

Furthermore, the coordinate data of the destination image area calculated in the third step may be obtained by extracting an outline of a destination object in the destination image area and by calculating the coordinates of an area encircled by the outline.

In the system in accordance with present invention described above, the user can specify a desired area within the display image as a destination image area and therefore specify a plurality of destination image areas within the display image. The database contains the coordinates of a destination image area and destination data associated therewith. When the user makes a call, the system searches the database for data based on the coordinates of the area specified in the display image and gives the destination data. In this way, the system in accordance with the present invention allows the user to register a destination object included in the display image, as well as its associated destination data, with the database and to make a call to a desired destination object within the display image based on the database. Therefore, the present invention makes it possible for the user to make a call by simply specifying a desired destination object in the display image.

The system in accordance with the present invention stores paste images, each created by pasting a plurality of destination images and a title image, in the storage unit. Because paste images are classified according to title images, a desired destination image may be displayed quickly by searching for the title image. In addition, even when there are many destinations, the system displays the images of the destinations on the screen to allow the user to visually register or select a desired destination. Therefore, as compared with the conventional system in which it takes long to search for a desired destination image, the system in accordance with the present invention searches for it more quickly.

BRIEF DESCRIPTION OF THE DRAWINGS

FIG. 3 is a diagram showing an example of table data composed of coordinate data and destination data and stored in a database.

FIG. 4 is a diagram showing the scrolling of the display screen toward the top-right corner.

FIG. 5(a) to FIG. 5(b) are diagrams showing an example of area specification using handwritten lines.

FIG. 6 is a diagram showing an example of the paste image of map image data.

PREFERRED EMBODIMENTS OF THE INVENTION

An embodiment of the present invention will now be described more in detail with reference to the drawings.

Figure 1:
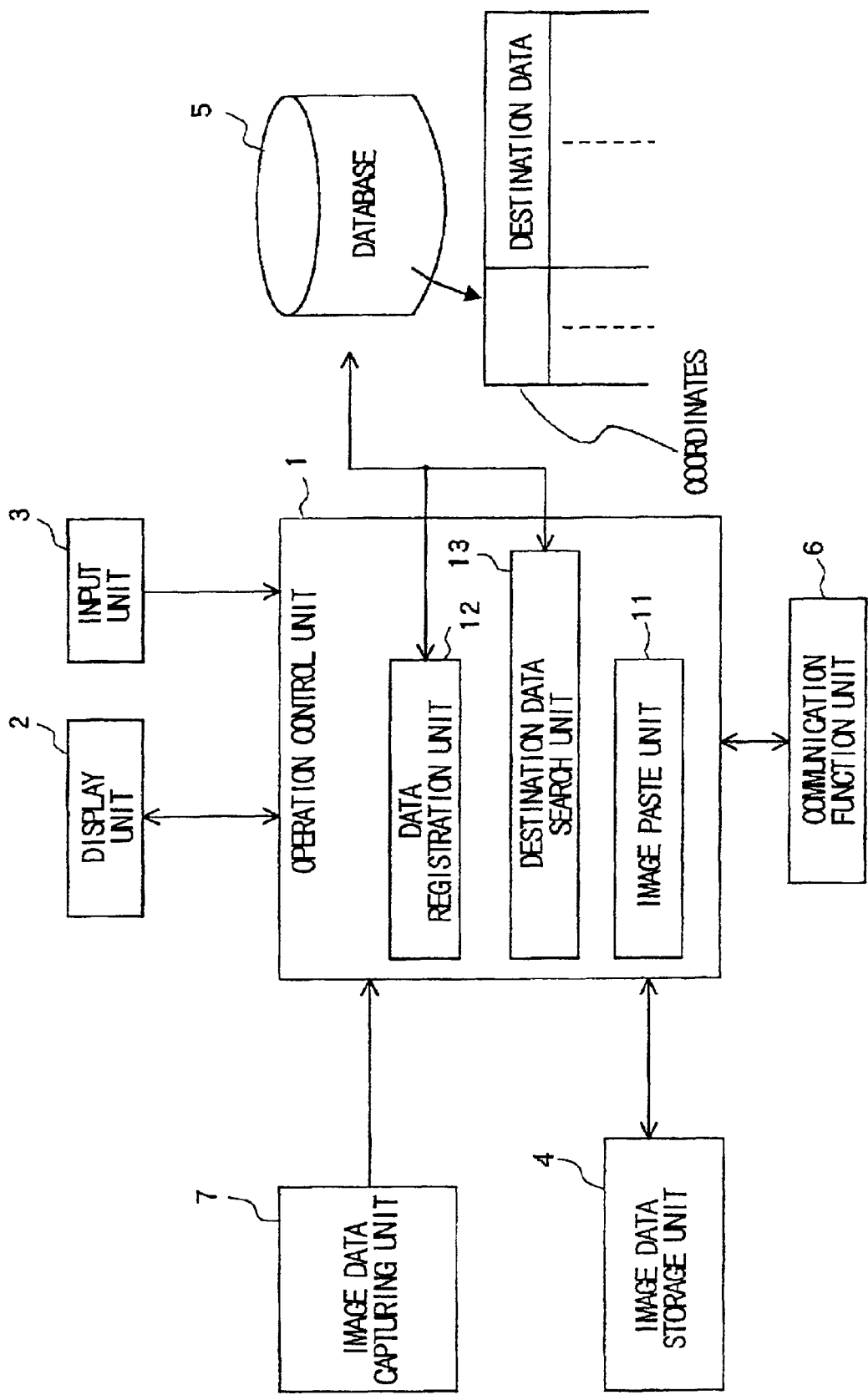
FIG. 1 is a block diagram showing the overall configuration of a destination calling control system used in an embodiment according to the present invention.

FIG. 1 is a block diagram showing the overall configuration of the embodiment of a destination calling control system according to the present invention. This destination calling control system comprises an operation control unit 1, a display unit 2, an input unit 3, an image data storage unit 4, a database 5 formulated on a memory device, a communication function unit 6, and an image data capturing unit 7.

The image data capturing unit 7 is connected to a camera such as a digital camera to capture an image photographed by the camera. In this embodiment, image data which is of a predetermined size and which contains a plurality of destinations is captured from the camera. The captured image data is sent to the operation control unit 1.

The image data storage unit 4 stores therein paste images for which pasting and editing have been performed by the operation control unit 1. In this embodiment, the image data storage unit 4 contains paste images each composed of image data pasted in a 3×3 matrix form.

The display unit 2, which has a touch screen, displays thereon paste images stored in the image data storage unit 4 and, at the same time, allows the user to touch a desired area with a finger to enter desired data (for example, the user can create handwritten images or add data) or to select data to be displayed. The input unit 3 provides at least a ten-key pad composed of the 1 key to the 9 key (for example, telephone number keys). With this ten-key pad, the user can select data to be displayed or add data. In the description given below, it is assumed that the size of the touch screen on the display unit 2 equals the size of each paste image data stored in the image data storage unit 4 described above.

The database 5 stores therein a table indicating the correspondence between the destination telephone numbers of the destination image areas assigned to the split images constituting each of the paste images stored in the image data storage unit 4 and the touch screen coordinates of the destination image areas.

The communication function unit 6 communicates with an external terminal. It dials a telephone number searched for by the operation control unit 1 and receives data (for example, receives electronic mail or FAX data) from an external terminal.

The operation control unit 1 pastes image data received via the image data capturing unit 7 and handwritten images created with the use of the touch screen, stores the image, created through pasting, into the image data storage unit 4, registers data with the database 5, searches for a destination telephone number, and performs other related operations. The main components of the operation control unit 1 are an image paste unit 11, a data registration unit 12, and a destination data search unit 13.

The image paste unit 11 pastes image data received via the image data capturing unit 7 and handwritten images created on the touch screen, according to the instructions entered via the touch screen or the instructions entered from the ten-key pad on the input unit 3. An example of the paste procedure executed by the image paste unit 11 is shown in FIG. 2(a) to FIG. 2(e). These steps will be described below.

The nine images, P1–P9, are pasted during image data pasting as follows. First, the user creates split image P5, which will be used as a reference image during pasting, by drawing it on the touch screen (See FIG. 2(a)). To create this split image P5, also called a title image, the user executes a program which includes title image creation means (not shown in the figure) of the operation control unit 1.

Figure 2:
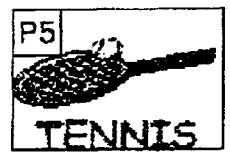
FIG. 2(a) to FIG. 2(e) are diagrams showing an example of a paste procedure.
Figure 2:
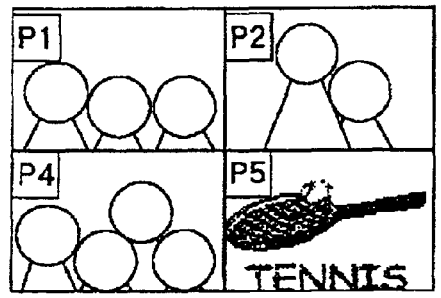
Figure 2:
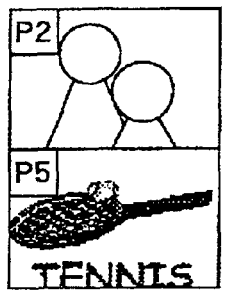
Figure 2:
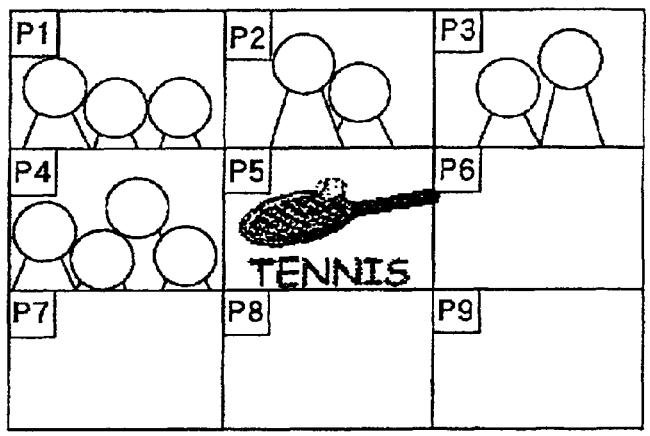
Figure 2:
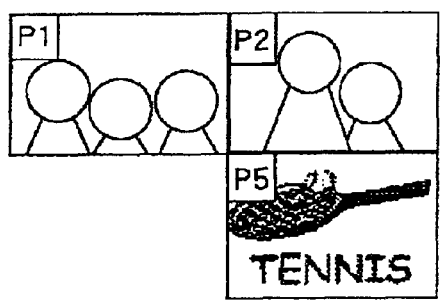

Then, image data, which will be used as split image P2, is captured via the image data capturing unit 7 and is pasted above split image P5 (See FIG. 2(b)). Then, image data, which will be used as split image P1, is captured via the image data capturing unit 7 and is pasted to the left of split image P2 (See FIG. 2(c)). Then, image data, which will be used as split image P4, is captured via the image data capturing unit 7 and is pasted to the left of split image P5 (See FIG. 2(d)). Executing these steps paste the image data, composed of split images P1–P9, in a 3×3 matrix form to produce the paste image shown in FIG. 2(e). This paste image is assigned a title, such as "tennis circle (page 1)", and is stored in the image data storage unit 4. For split images P1–P4 and P6–P9, images taken by a digital camera or images read by a scanner may be used.

The data registration unit 12 calculates the coordinates of a destination image area included in a paste image on the touch screen. This destination image area is the area specified by the user via the touch screen or the mouse. Then, the data registration unit 12 associates destination data (destination telephone number, destination FAX number, destination mail address, name, and so on), entered into the destination data area via the touch screen or the ten-key pad, with the coordinates calculated above and then registers this association data with the database 5. For example, coordinate data and destination data are registered with the database 5 as table data such as the one shown in FIG. 3.

The destination data search unit 13 calculates the coordinates of an area of a paste image displayed on the touch screen when the user specifies it via the touch screen or the mouse and, at the same time, searches the database 5 for destination data, such as a telephone number, based on the calculated coordinates. The destination data searched for by the destination data search unit 13 is sent to the communication function unit 6.

Next, the data registration procedure and the destination data search procedure executed by the destination calling control system in this embodiment, in conjunction with the actual operation of the operation control unit 1, will be described in detail.

(1) Register Data

The operation control unit 1 displays selection items, such as "Register Data" and "Search for Destination Data", on the touch screen according to the program that is prepared in advance. When the user selects one of displayed items from the touch screen, the operation control unit 1 displays the selected paste image stored in the image data storage unit 4. The user may select any paste image from the image data storage unit 4 by entering, via the touch screen or the pointing device (such as a mouse or a pen), the title of a paste image to be displayed. For example, entering the title "tennis circle" allows the user to display the paste image shown in FIG. 2(e). Also, when a predetermined split image (title screen) selected from the split images of the paste image, for example, split image P5 of the paste image shown in FIG. 2(e), is defined as the default, the title screen is always displayed first when the paste image is displayed on the touch screen.

When the desired paste image appears on the touch screen, the user scrolls the displayed image to display a desired image. For example, to display split image P3 contained in the paste image shown in FIG. 2(e), the user must scroll the display screen toward the top-right corner as shown in FIG. 4. Instead of scrolling the screen, the numbers 1 to 9 may be assigned to numeric keys 1 to 9 on the ten-key pad so that a desired split image may be displayed by selecting the corresponding key on the ten-key pad.

When the desired split image appears, the user specifies a desired area (destination image area) in the displayed split image via the touch screen or the pointing device. For example, the user encircles area A with a handwritten line as shown in FIG. 5(a) and, in addition, encircles another area, area B, with a handwritten line as shown in FIG. 5(b). The data registration unit 12 calculates the coordinates of areas A and B encircled by the handwritten lines. At this time, the data registration unit 12 may extract the outlines of areas A and B and calculate the coordinates of the areas encircled by the outlines. Doing so prevents the coordinates from being overlapped when area A is near area B.

After specifying areas A and B as destination image areas, the user enters destination data (destination telephone number, destination FAX number, destination mail address, name, and so on) on areas A and B via the touch screen or the pointing device. The data registration unit 12 associates entered destination data on areas A and B with the coordinates of areas A and B and registers the associated data with the database.

(2) Search for Destination Data

The "Search for Destination Data" item comprises the "Search for Destination Telephone Number", "Search for FAX Number", and "Search for Destination Electronic Mail Address" items. The user may select any of these selection items displayed on the touch screen. In the description given below, assume that the user will select "Search for Destination Telephone Number" from "Search for Destination Data".

When the user selects "Search for Destination Telephone Number" from the selection items displayed on the touch screen, the operation control unit 1 gets the paste image from the image data storage unit 4 and displays it on the touch screen. The user scrolls the displayed image to display the desired split image on the touch screen and selects the desired address from the displayed split image.

When the destination is selected, the destination data search unit 13 calculates the coordinates of the specified area and, at the same time, searches the database 5 for the destination telephone number corresponding to the calculated coordinates. The destination telephone number searched for by the destination data search unit 13 is sent to the communication function unit 6. Upon receiving the destination telephone number from the destination data search unit 13, the communication function unit 6 starts dialing the destination telephone number.

When the database does not contain data corresponding to the coordinates of the specified area, the destination data search unit 13 displays on the touch screen a message indicating that there is no such coordinate data and prompts the user to register data on the specified area.

The search operation that is performed when the user selects "Search for Destination Telephone Number" was described above. When the user selects "Search for FAX Number" or "Search for Destination Electronic Mail Address", the destination data search unit 13 performs the same search operation and then the communication function unit 6 dials the FAX number or electronic mail address that is searched for.

Although, in this embodiment, the database search operation is started after the user selects a search mode such as "Search for Destination Telephone Number" or "Search for FAX Number", this process may be changed according to the design. For example, the user may specify a destination image first, search for destination data (destination telephone number, destination FAX number, and so on) on the destination image and, from the destination data that was searched for, specify a desired item (for example, destination telephone number). In this process, the destination data on the specified item is sent to the communication function unit 6.

In this embodiment, a 3×3 paste image is stored in the image data storage unit 4. The paste image size and the number of split images are not limited to this but may be changed according to the design.

In addition, although image data is captured via the image data capturing unit 7 described above, data may be transferred from a camera (such as a digital camera) via an infrared light or a cable. Image data may also be captured via a modem (electronic mail), a scanner, or a recording medium such as an IC card or a memory card.

Furthermore, captured image data may be used with a picture or a handwritten input image entered from the touch screen.

Moreover, a paste image composed of nine (that is, 3×3) split images (map data), such as the one shown in FIG. 3, may be created as a paste image to be stored in the image data storage unit 4. In this case, the user can select a desired destination (hotel, leisure facilities, and so on) from the map data to call the selected destination. The user may also use the procedure described above to registrar data with the database.

The meritorious effects of the present invention are summarized as follows.

As described above, the system in accordance with the present invention allows the user to register a plurality of destinations with the database using one display image and, when making a call, to call a destination selected from a plurality of destinations that are displayed. Therefore, as compared with the conventional system in which only one destination is called from one display image, operability is significantly increased.

In addition, the system in accordance with the present invention allows the user to attach a title screen to a paste image and to search for a desired destination image easily based on the title image. Therefore, the time required for selecting a destination is much shorter than that required by the conventional system in which destination images to be displayed are read sequentially from the memory.

Furthermore, the system in accordance with the present invention displays an image on the screen as destination data to enable the user to register or select a destination visually. This means that, even when the display screen is small and there are many destinations, the user can easily register or select destinations. Therefore, as compared with the conventional system in which the user selects a destination from character data (destination telephone number or name), operability is significantly increased.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A destination contacting control system comprising:
    a database;
    an image storage for storing image data;
    a display for displaying said image data;
    area specification means for specifying a destination image area within an image displayed on said display;
    input means for entering destination data corresponding to the destination image area said destination data chosen from the group consisting of telephone number, fax number, and email;
    data registration means for calculating coordinate data of said destination image area, associating said coordinate data with said destination data, and storing an associated data for said coordinate data and said destination data in said database;
    a searcher for retrieving destination data based on said associated data a portion of said image selected by said area specification means; and
    contacting means for contacting the destination based on the destination data and the destination area.

2. The destination contacting control system as defined by claim 1, wherein said display comprises a touch screen.

3. The destination contacting control system as defined by claim 1, further comprising:
    an image capturing device for capturing a plurality of images;
    a title image creator for creating a title image; and
    an image paster for creating a paste image comprising said title image and said plurality of destination images and for storing the said image storage.

4. The destination contacting control system as defined by claim 3, wherein said display displays said title image as a reference and allows a user to scroll across the paste image.

5. The destination contacting control system as defined by claim 3, wherein
    each destination image and the title image assigned a corresponding number on a numeric keypad, and
    said display displays the destination image or the title image in response to the number of the numeric key that is pressed.

6. The destination contacting control system as defined by claim 3, wherein the destination image captured by said image capturing device is a photographic image.

7. The destination contacting control system as defined by claim 3, wherein at least one of destination images of said paste image is a handwritten input image created by said title image creator.

8. The destination contacting control system as defined by claim 1 wherein said data registration means defines an outline of said destination image area, calculates the coordinate data of said outline, associates said coordinate data with said destination data, and stores said associated data in said database.

9. The destination contacting control system according to claim 1, further comprising:
    destination data search means for calculating coordinates of a selected area indicating a destination image area for searching said database mans for the destination data associated with the coordinates; and
    calling means for calling the destination associated with the destination data obtained by said destination data search means.

10. A destination calling control method comprising:
    capturing image data;
    storing the image data;

displaying said image data as a displayed image;

selecting a portion of the image area within said displayed image;

entering destination data corresponding to said portion of the image area, said destination data chosen from the group consisting of telephone number, fax number, and email;

calculating coordinate data for said portion of the image area, associating said coordinate data with said portion of the image area, and storing the associated data in a database;

retrieving destination data by selecting said portion of the image area;

calculating said coordinates of said specified destination image area and searching said database for the destination data; and contacting said destination corresponding to the destination data.

11. The destination calling control method as defined by claim 10, further comprising:

creating a paste image by pasting a plurality of destination images and a title image;

storing said paste image;

displaying said title image as a reference; and selecting a destination image by scrolling across said paste image on the display.

12. The destination calling control methods as defined by claim 10, further comprising assigning a unique number on a numeric keypad to a paste image, and displaying the destination image or the title image in response to the number of the numeric key that is pressed.

13. The destination calling control method as defined by claim 12, wherein a photographic image or a handwritten input image is used as the destination images constituting said paste image.

14. The destination calling control method as defined by claim 11, wherein a photographic image or a handwritten input image is used as the destination image constituting said paste image.

15. The destination calling control method as defined by claim 10, wherein the coordinate data of said destination image area is obtained by extracting an outline of a destination object in said destination image area and by calculating said coordinates of an area encircled by said outline.

16. A computer readable program product, said program product is configured to execute in a computer the following destination calling control method comprising:

capturing desired image data and storing said data;

displaying said image data;

specifying a desired area within an image displayed corresponding to said image data and, entering destination data corresponding to a desired image area said destination data chosen from the group consisting of telephone number, fax number, and email;

calculating coordinate data of said desired area, associating said coordinate data with said destination data and storing said associated data in a database;

specifying as a destination, the desired area in the image and calculating the coordinate of the desired area specified searching said database for the destination data based on the coordinate;

retrieving said destination data by selecting said desired area of said image and calling the destination based on the destination data.

17. The computer readable program product as defined by claim 16, further comprising creating a paste image by pasting a plurality of destination images with a title image;

storing said paste image;

displaying said title image as a reference; and selecting said destination image by scrolling across the paste image on the display screen.

18. The computer readable program product as defined by claim 17, wherein a photographic image or handwritten input image is used as the destination images constituting said paste image.

19. The computer readable program product as defined by claim 16, further comprising:

assigning a unique number on a numeric keypad to a paste image, and displaying the paste image assigned to said numeric key in response to the number of the numeric key that is pressed.

20. The computer readable program product as defined by claim 19, wherein a photographic image or a handwritten input image is used as the destination images constituting said paste image.

21. The computer readable program product as defined by claim 16 wherein the coordinate data of said destination image area calculated is obtained by extracting an outline of a destination object in said destination image area and by calculating said coordinates of an area encircled by said outline.

22. A computer readable program product according to claim 16 wherein said program product is carried on a medium.

23. A destination contacting control system comprising:

a memory device configured to store a database;

an image storage unit for storing image data;

a display unit for displaying the image data;

an area specification unit configured to allow a user to specify a portion of the area within the image displayed on said display unit;

an input unit for entering destination data, said destination data chosen from the group consisting of telephone number, fax number, and email;

a data registration unit configured to calculate coordinate data of the portion of the area specified by said area specification unit as a destination image area, associating the coordinate data with the destination data entered from said input unit, and to register the associated data in said database;

an area selection unit to select a portion of the area within the displayed image;

a destination data search unit configured to calculate the coordinates of the portion of the area specified by said area selection unit as a destination and to search said database for the destination data based on the coordinates; and a calling unit calling the destination based on the destination data obtained by said destination data search unit.

24. The destination contacting control system as defined by claim 23, wherein said display unit comprises a touch screen.

25. The destination contacting control system as defined by claim 23, further comprising:

an image capturing unit configured to capture at least one destination image;

a title image creation unit creating a title image; and an image pasting unit configured to paste the title image created by said title image creation unit and destination image captured by said image capturing unit and to store the pasted images into said image storage unit.

26. The destination contacting control system as defined by claim 25, wherein said display unit displays said title image of a paste image as a reference and allows the user to scroll across a whole of the paste image.

27. The destination contacting control system as defined by claim 25 wherein
   each destination image and the title image of the paste image is assigned a number on a keypad and
   said display unit displays the destination image or the title image in response to the key of said keypad that is pressed.

28. The destination contacting control system as defined by claim 25 wherein the destination image captured by said image capturing unit is a photographic image.

29. The destination contacting control system as defined by claim 25 wherein at least one of said destination images of said paste image is a handwritten input image created by said title image creation unit.

30. The destination contacting control system as defined by claim 23 wherein said data registration unit extracts an outline of a destination object in the destination image area, calculates the coordinate data of an area encircled by the outline, associates the coordinate data with the destination data, and stores the associated data in said database.

31. A destination calling control method comprising:
   capturing an image;
   storing said image;
   selecting a portion of said image;
   entering destination data corresponding to said portion of said image, said destination data chosen from the group consisting of telephone number, fax number, and email;
   storing said destination data corresponding to said portion of said image;
   retrieving said destination data by selecting said portion of said image; and
   dialing a call utilizing said destination data.

32. The destination calling control method according to claim 31 wherein said image includes at least a portion of a person.

33. A destination calling apparatus comprising:
   a memory for storing an image;
   a display for displaying said image;
   a selector for selecting a portion of said image;
   an input device for entering destination data corresponding to said portion of said image, said destination data chosen from the group consisting of telephone number, fax number, and email;
   a register for calculating coordinate data for said portion of said image, associating said coordinate data with said destination data, and storing said associated data in said memory;
   a searcher for retrieving destination data based on coordinates of a portion of said image selected by said selector; and
   a calling device for calling using the destination data retrieved by said searcher.

* * * * *